United States Patent [19]

Lang

[11] Patent Number: 4,710,304

[45] Date of Patent: Dec. 1, 1987

[54] METHOD FOR IMPROVING THE UTILIZATION OF POLYELECTROLYTES IN DEWATERING AQUEOUS SUSPENSIONS

[75] Inventor: James J. Lang, Springfield, Oreg.

[73] Assignees: Joseph J. Campbell; Equivest, Inc., both of Prairie Village, Kans.

[21] Appl. No.: 883,085

[22] Filed: Jul. 8, 1986

Related U.S. Application Data

[63] Continuation-in-part of Ser. No. 674,782, Nov. 26, 1984, abandoned.

[51] Int. Cl.$^4$ ............................................... C02F 1/56
[52] U.S. Cl. .................................... 210/734; 210/732; 210/738
[58] Field of Search ............... 210/609, 725, 727, 728, 210/732–736, 738, 192, 198.1, 206; 524/922

[56] References Cited

U.S. PATENT DOCUMENTS

| | | | |
|---|---|---|---|
| 3,087,890 | 4/1963 | Pye | 210/727 |
| 3,399,133 | 8/1968 | Gerdes et al. | 210/709 |
| 3,523,889 | 8/1970 | Eis | 210/207 |
| 3,605,775 | 9/1971 | Zaander et al. | 210/709 |
| 3,817,861 | 6/1974 | Slusarczuk | 210/728 |
| 4,201,867 | 5/1980 | Gasper | 210/738 |
| 4,396,513 | 8/1983 | Haldeman | 210/747 |
| 4,470,907 | 9/1984 | Sencza | 210/206 |

FOREIGN PATENT DOCUMENTS

| | | | |
|---|---|---|---|
| 0056117 | 7/1982 | European Pat. Off. | 210/729 |
| 2457360 | 6/1975 | Fed. Rep. of Germany | 210/198.1 |

OTHER PUBLICATIONS

Polyelectrolytes for Water and Wastewater Treatment, Ed. W. L. K. Schwoyer, CRC Press, 1981, pp. 2, 3, 5, 7, 16–19 & 245.

*Proceedings,* AWWA Seminar on use of Organic Polyelectrolytes in Water Treatment, Las Vegas, Nevada, Jun. 5–9, 1983, pp. 249–264.

Proceedings AWWA Seminar on Polyelectrolyte Aides to Better Water Quality, Chicago, Ill., Jun. 4, 1972.

*Primary Examiner*—Peter Hruskoci
*Attorney, Agent, or Firm*—Arvid Zuber

[57] ABSTRACT

This invention relates to a method for improving the utilization of water-soluble, high molecular weight (molecular weight above about 1,000,000) polyelectrolytes in the dewatering of aqueous suspensions. By aging a mixture of the polyelectrolyte and water for a period of at least 6 hours to form an aged solution the amount of polyelectrolyte required to effectively dewater an aqueous suspension may be reduced to as little as 50% of the amount required when an unaged solution is used.

12 Claims, No Drawings

METHOD FOR IMPROVING THE UTILIZATION OF POLYELECTROLYTES IN DEWATERING AQUEOUS SUSPENSIONS

This application is a continuation-in-part of my copending application Ser. No. 674,782 filed Nov. 26, 1984, now abandoned.

BACKGROUND OF THE INVENTION

This invention relates to a method for improving the utilization of high molecular weight polyelectrolytes in the dewatering of aqueous suspensions; the method reduces the amount of polyelectrolyte required to effectively dewater an aqueous suspension and thereby provides a significant reduction of the costs of the polyelectrolyte necessary to effectively dewater an aqueous suspension. More particularly, the polyelectrolyte required to effectively dewater an an aqueous suspension may be reduced to as little as one-half of that required using conventional techniques.

As a general practice, high molecular weight polyelectrolytes are mixed and used shortly therafter or only after moderate mixing, holding or aging periods in the neighborhood of 30–45 minutes. Metered amounts of the polyelectrolyte are then continuously fed to a flow of an aqueous suspension in the dewatering process. For example, the smaller municipal wastewater treatment plants where polyelectrolyte solution requirements per filter may be of the order of 500–600 gallons of 0.001 parts by weight of polyelectrolyte solution per filter per run, the polyelectrolyte is mixed immediately prior to use in a single tank. Larger installations with greater requirements may use a continuous mixer in which "aging" (holding) times for the mixed polyelectrolyte may range from a few minutes up to about an hour. Typically, polyelectrolyte dosage is based on experience obtained using the solution mixed in the plant.

SUMMARY OF THE INVENTION

In distinction to prior practice, I have now found that by forming a mixture of a high molecular weight, organic polyelectrolyte and water and aging the mixture for at least six hours to form a solution the amount of polyelectrolyte required can be reduced to as little as one-half of the amount of polyelectrolyte required when conventional practices are followed. My process for minimizing usage of a high molecular weight, organic polyelectrolyte in the dewatering of aqueous suspensions comprises forming a mixture of a water-soluble high molecular weight, organic polyelectrolyte and water; thereafter aging said mixture for a period of at least six hours to prepare an aged solution of said polyelectrolyte; determining the optimum amount of said solution required to effectively dewater an aqueous suspension; and thereafter using a solution prepared by the aforesaid steps of mixing and aging in an amount approximately equal to the predetermined amount of solution required to effectively dewater the aqueous suspension. My invention may also be stated to be the process for dewatering an aqueous suspension which comprises forming a mixture of a high molecular weight, organic polyelectrolyte and water; aging said mixture for a period of at least six hours to prepare an aged solution of said electrolyte and using said aged solution in an amount equal to the minimum amount required to effectively dewater said aqueous suspension.

PREFERRED EMBODIMENTS

In the practice of this invention the aged polyelectrolyte solution is added to a stream or flow of an aqueous suspension. More particularly, my invention is the process for minimizing the amount of high molecular weight, organic, water-soluble polyelectrolyte required to effectively dewater a flow of an aqueous suspension which comprises: forming a mixture of of a high molecular weight, water-soluble polyelectrolyte and water, thereafter aging said mixture for a period of at least six hours to form a solution; determining the amount of said solution required to effectively dewater said aqueous suspension; thereafter continuously adding a solution prepared by the aforesaid steps of mixing and aging in an amount approximately equal to the predetermined amount of solution required to effectively dewater said flow of the aqueous suspension. My invention may also be said to be the process for dewatering a stream of aqueous suspension which comprises: forming a mixture of a high molecular weight, water-soluble polyelectrolyte and water, aging said mixture for a period of at least 6 hours to prepare an aged solution of said polyelectrolyte; and, dewatering a stream of the aqueous suspension using said solution in an amount approximately equal to the minimum amount required to effectively dewater said stream of aqueous suspension. The invention can also be described as an improvement in the process of dewatering an aqueous suspension by use of a solution of a high molecular weight, water-soluble polyelectrolyte; that is, in a process for dewatering a flow of an aqueous suspension by use of a high molecular weight, water-soluble polyelectrolyte my invention is the improvement which comprises mixing said polyelectrolyte with water and thereafter aging said mixture for at least 6 hours to form a solution used to dewater said flow of aqueous suspension.

Generally, the process of this invention is applicable to the high molecular weight (molecular weights in excess of about 1,000,000), water-soluble polyelectrolytes. In order to achieve the economic advantages herein disclosed it is necessary that the polyelectrolyte be mixed with water and aged for at least 6 hours, and, preferably, at least 8 hours. Mixing should be continued until all "fish eyes" disappear; preferably, mixing or mild agitation should be continued through the aging period. Longer periods of mixing or of aging the mixture are not excluded from the practice of this invention although it is to be noted that no significant additional improvement in polyelectrolyte usage is achieved by mixing or aging (holding) times longer than about 20 hours. As is well known, mixing should not be so vigorous as to apply shearing forces to the polyelectrolyte or otherwise cause its degradation.

The process of my invention is generally applicable to the high molecular weight, water-soluble polyelectrolytes whether the polymer is in dry form such as granules, the polymer is suspended in a non-aqueous medium such as mineral oil, or the polymer is in the form of an emulsion. The process is equally applicable to cationic, anionic and non-ionic polyelectrolytes so long as they are high molecular weight (molecular weights in excess of about 1,000,000) polymers. The process of my invention is particularly well-suited to polymers derived from one or more acrylic monomers such as acrylamide, acrylic acid, acrylic esters and dimethylaminoethyl methacrylate and the derivatives of such polymers obtained by hydrolysis or by quaternization with methyl chloride, dimethyl sulfate or other well known quaternizing compounds.

accuracy. The results of the six tests are tabulated below.

| TEST NO. | POLYMER FEED GAL/MIN | POLYMER FEED LB/HR | SLUDGE SOLIDS FEED GAL/MIN | FINAL CAKE SOLIDS (%) | POLYMER FEED, % OF STANDARD |
| --- | --- | --- | --- | --- | --- |
| 1 | 0.53 | 0.33 | 21.2 | 14.2 | 35% |
| 2 | 0.37 | 0.23 | 21.2 | 15.6 | 51% |
| 3 | 0.22 | 0.14 | 21.2 | — | — |
| 4 | 0.68 | 0.43 | 21.2 | 14.9 | 66% |
| 5 | 0.83 | 0.52 | 21.2 | 14.4 | 80% |
| 6 | 0.98* | 0.61 | 21.2 | 14.4 | 94% |
| Std | 1.29 | 0.65 | 21.2 | 14.+ | 100% |

*Obvious signs of excess polyelectrolyte

The following examples illustrate the invention:

EXAMPLE I

The process of this invention was tested in a small municipal wastewater treatment plant located in Eastern New Jersey. The plant, typically, produces a thin sludge (less than 1% solids). Standard procedure in the plant is to mix 3 pounds of PERCOL(®) 757, a cationic polymer flocculant produced by Allied Colloids, Inc., 2301 Wilroy Road, Suffolk, Va. 23434 to produce 0.001 (Wt/Wt) solution. PERCOL(®) 757 is described in U.S. Pat. No. 4,196,513 as a copolymer made up of acrylamide/dimethylaminoethylmethacrylate methyl chloride units in the ratio of 40/60 having an intrinsic viscosity of 8.00 dl/g at 30° C. in 1M NaCl. The solution is used within an hour or two of the time of mixing by adding the 0.1% solution at the rate of about 1.30 gal per min to sludge being fed at the rate of approximately 21 gal per min. The Treated sludge is dewatered in a one meter belt press having a gravity dewatering section and wedge section feeding into a three roll press. Historically, the final dewatered sludge has a dry solids content of slightly better than 14%. A week prior to the tests the feed sludge had a solids content of 0.76% and the press delivered a cake with a solids content of 14.9%. In the days immediately prior to the test the sludge feed had a solids content of 0.6% and the dry cake solids were 12.1%. During the period of the test the sludge feed solids averaged 0.55%

In the comparative test 4.17 pounds of PERCOL(®)757 was mixed with stirring in 200 gal of tap water to give a polymer concentration of 0.25% (Wt/Wt) at approximately 4:00 p.m. Stirring was continued overnight. On the following morning the solution was diluted to 400 gals. when it was discovered that the planned dose rate was below the capacity of what the metered pump could deliver to the sludge stream, giving a polyelectrolyte concentration of 0.125% (Wt/Wt). six tests comparing the performance of the solution prepared according to the teaching of this invention with the standard procedure were made. All settings on the belt press were the same as those for standard operations in the plant with the exception of the polyelectrolyte feed. Tests were run at six settings of the polyelectrolyte feed pump, each for one-half hour with samples taken near the end of each test with the exception of Test No. 3 where incomplete flocculation resulted at a pump setting of 0.22 gal per min. It is not known whether this failure resulted from actual delivery of too little polyelectrolyte or whether the setting on the pump was below that required for pump accuracy. The results of the six tests are tabulated below.

The tests show that by using the method of this invention polyelectrolyte usage may be reduced as much as 50% while achieving comparable dry solids in the final cake.

EXAMPLE II

The method of this invention was used in a sewage treatment plant near Independence, Mo. to dewater the sludge produced in that plant. On the evening prior to the plant run 5.2 pounds of PERCOL(®) 763 described by the manufacturer as a high molecular weight, cationic copolymer of a quarternary acrylate salt and acrylamide was mixed with 250 gallons of water. The mixture was stirred overnight and stirring was discontinued in the morning. PERCOL(®) 763 is the polyelectrolyte routinely used to dewater sewage sludge in that plant. The following evening a second batch of the same polyelectrolyte was mixed by the plant operator following the usual procedure of adding 4 pounds of the polyelectrolyte to 250 gallons of water and mixing until no "fish eyes" were apparent, a period of about one-half hour. In this plant the sludge is dewatered on one or more of four identical filter presses consisting of a gravity dewatering section followed by two roller sections. In this comparitive run two separate filter presses were used. The test solution was fed to one press and the standard solution to the other. The sludge stream was split to feed both filter presses. The test solution was fed to one press and the standard solution to the other. The sludge stream was split to feed both filter presses. Polymer flow to each of the filter presses was independently adjusted to give optimum dewatering of the sludge streams. The test was run from about 6:00 p.m. to about 8:00 p.m. when the 250 gallons of the solution prepared by the usual method was exhausted. During the period of the tests the dewatering obtained by both solutions was approximately equal with, perhaps, some slight advantage to the solution mixed the night before.

When the amounts of solutions used during the test were calculated it was found that comparable dewatering had been obtained with the test solution by using only about one-half of the amount of polyelectrolyte required when the polymer was mixed by the method normally used in the plant.

EXAMPLE III

A series of tests was run to compare filter rates and amounts of polymer required to give comparable filter rates. The polymers mixed by the method of this invention were compared to the same polymers mixed by the conventional methods. The following polyelectrolytes were used in these tests:

1. PERCOL(®) 778N supplied by Allied Colloids, 2301 Wilroy Road, Suffolk, Virginia and described as a very high charge density, high molecular weight cationic polymer supplied as a 50% active liquid dispersion in light mineral oil.
2. E-154 supplied by Allied Corporation, Chemical Sector, Morristown, N.J., a dry anionic polymer described as hydrolyzed polyacrylamide with the formula $(C_3H_5NO.C_3H_4Na)_x$ and a molecular weight of several million.
3. E-147 supplied by Allied Corporation, Chemical Sector, Morristown, N.J., an anionic polyelectrolyte described as a acrylamide-acrylic acid copolymer emulsion in paraffin oil and having a polymer molecular weight of several million.

Polymer 1. was used with a sewage sludge containing approximately 0.56% solids. Polymers 2. and 3. were tested on a 1% clay suspension prepared by high speed mixing of clay and water. In each case the polymer was prepared as a 0.1% solution. The amounts of solution indicated in the data tabulated below were added to 200 ml of the aqueous dispersion and mixed with the dispersion. The mixture was immediately poured into a Buchner funnel equipped with moistened 11 cm Whatman Qualitative No. 2 filter paper with a particle retention of 8 μm and under a vacuum of 26 inches of mercury. The time for 150 ml of filtrate to flow through the filter was measured as was the time required to form a filter cake, the latter time being the time required to form a cake with a well-defined surface and an essentially clear supernate. The data obtained are tabulated below.

| | milliliters of 0.1% solution | | | | |
|---|---|---|---|---|---|
| Polymer 1. - Sludge | 0.1 | 0.2 | 0.3 | 0.4 | 0.5 |
| Time for 150 ml of filtrate, sec's | | | | | |
| Test Solution | 70 | 62 | 56 | 55 | 77 |
| Standard Solution | 80 | 79 | 74 | 81 | 83 |
| Time to form filter cake, sec's | | | | | |
| Test Solution | 150 | 120 | 120 | 105 | 150 |
| Standard Solution | 156 | 160 | 153 | 161 | 159 |
| Polymer 2. - Clay | 0.06 | 0.08 | 0.1 | 0.12 | |
| Time for 150 ml of filtrate, sec's | | | | | |
| Test solution | 118 | 58 | 52 | 87 | |
| Standard Solution | | 126 | 132 | 157 | |
| Time to form filter cake, sec's | | | | | |
| Test Solution | 204 | 109 | 98 | 156 | |
| Standard Solution | | 211 | 236 | 249 | |
| Polymer 3. - Clay | 0.025 | 0.05 | 0.075 | 0.1 | 0.2 |
| Time for 150 ml of filtrate, sec's | | | | | |
| Test Solution | 134 | 50 | 79 | 62 | 87 |
| Standard Solution | | 146 | 132 | 117 | 89 |
| Time to form filter cake, sec's | | | | | |
| Test Solution | 227 | 97 | 148 | 105 | 147 |
| Standard Solution | | 224 | 228 | 210 | 158 |

As can be seen from the data, in no case did the standard solution approach the performance of the test solution, clearly showing the superiority of the method of this invention.

What is claimed is:

1. The process for dewatering a stream of an aqueous suspension which comprises:

forming a mixture of a water-soluble polyelectrolyte with a molecular weight above about 1,000,000 and water aging said mixture for a period of at least six hours to prepare an aged solution of said polyelectrolyte adding an amount of said aged solution to said aqueous suspension approximately equal to the minimum effective amount required to flocculate and dewater said aqueous suspension, and dewatering said aqueous suspension.

2. The process for minimizing the amount of a water-soluble polyelectrolyte required to effectively flocculate and dewater a flow of an aqueous suspension wherein said polyelectrolyte is a polymer with a molecular weight above about 1,000,000 derived from one or more acrylic monomers including derivatives thereof obtained by quarternizing such polymer and derivatives thereof obtained by hydrolyzing such polymer which comprises:

forming a mixture of said water-soluble polyelectrolyte and water aging said mixture for a period of at least six hours to form an aged solution determining the minimum effective amount of said aged solution required to flocculate and dewater said aqueous suspension.

thereafter continuously adding a solution prepared by the aforesaid steps of mixing and aging to said flow of aqueous suspension in an amount approximately equal to the amount determined to be the minimum effective amount of solution required to flocculate and dewater said flow of aqueous suspension, and thereafter dewatering said aqueous suspension.

3. The process of claim 1 or 2 wherein the polyelectrolyte is a cationic polymer.

4. The process of claim 1 or 2 wherein the polyelectrolyte is a anionic polymer.

5. The process of claim 1 or 2 wherein the polyelectrolyte is a dry, cationic polymer.

6. The process of claim 1 or 2 wherein the polyelectrolyte is in the form of a dispersion in a non-aqueous medium of a cationic polymer.

7. The process of claim 1 or 2 wherein the polyelectrolyte is in the form of an emulsion of a cationic polymer.

8. The process of claim 1 or 2 wherein the polyelectrolyte is a nonionic polymer.

9. The process of claim 1 or 2 wherein the aqueous suspension is a sewage sludge, the polymer is a cationic polymer and the flocculated suspension is dewatered on a filter press.

10. The process of claim 1 or 2 wherein the aqueous suspension is a sewage sludge, the polymer is a copolymer of acrylamide/dimethylaminoethylmethacrylate methyl chloride units in the ratio of 40/60 and the flocculated suspension is dewatered on a filter press.

11. The process of claim 1 or 2 wherein the aqueous suspension is a sewage sludge, the polyelectrolyte is a cationic copolymer of a quaternary acrylate salt and acrylamide and the flocculated suspension is dewatered on a filter press.

12. The process of claim 1 or 2 wherein the mixture is aged for a period of at least 8 hours.

* * * * *